(12) United States Patent
Chen et al.

(10) Patent No.: US 10,673,303 B2
(45) Date of Patent: Jun. 2, 2020

(54) ROBOTIC ARM (71) Applicant: AEOLUS ROBOTICS CORPORATION LIMITED, Hong Kong (HK)

(72) Inventors: Sheng-Chia Chen, Taipei (TW); Sheng-Chun Juan, Taipei (TW); Hong Bin Koh, Taipei (TW)

(73) Assignee: AEOLUS ROBOTICS CORPORATION LIMITED, Wan Chai (HK)

( * ) Notice: Subject to any disclaimer, the term of this patent is extended or adjusted under 35 U.S.C. 154(b) by 72 days.

(21) Appl. No.: 15/857,441

(22) Filed: Dec. 28, 2017

(65) Prior Publication Data

US 2019/0207468 A1 Jul. 4, 2019

(51) Int. Cl.
| | | |
|---|---|---|
| *B25J 9/06* | (2006.01) | |
| *H02K 7/116* | (2006.01) | |
| *B25J 9/10* | (2006.01) | |
| *F16H 25/20* | (2006.01) | |
| *F16H 19/06* | (2006.01) | |
| *B25J 17/02* | (2006.01) | |
| *B25J 9/02* | (2006.01) | |
| *B25J 9/12* | (2006.01) | |
| *F16H 19/08* | (2006.01) | |
| *F16H 37/14* | (2006.01) | |

(52) U.S. Cl.
CPC ............ *H02K 7/116* (2013.01); *B25J 9/02* (2013.01); *B25J 9/102* (2013.01); *B25J 9/104* (2013.01); *B25J 9/126* (2013.01); *B25J 17/02* (2013.01); *F16H 19/06* (2013.01); *F16H 19/08* (2013.01); *F16H 25/20* (2013.01); *F16H 37/14* (2013.01); *F16H 2019/0686* (2013.01)

(58) Field of Classification Search
CPC ..... F16H 2019/0686; F16H 2019/0681; F16H 25/20; B25J 9/104; B25J 17/0258; B25J 17/0283; B25J 9/046
USPC ....................................... 74/490.04
See application file for complete search history.

(56) References Cited

U.S. PATENT DOCUMENTS 4,496,278 A * 1/1985 Kaise .................. B25J 9/046
414/735
8,196,492 B1 6/2012 Denu
(Continued)

FOREIGN PATENT DOCUMENTS

| EP | 0108657 | 5/1984 |
|---|---|---|
| JP | S61192486 | 8/1986 |
| JP | S61236485 | 10/1986 |

OTHER PUBLICATIONS

European Patent Office, Extended European Search Report, European Patent Application No. 18213713.3, dated Apr. 30, 2019, 10 pages.

*Primary Examiner* — Victor L MacArthur
*Assistant Examiner* — Randell J Krug
(74) *Attorney, Agent, or Firm* — Fenwick & West LLP (57) ABSTRACT

The present disclosure relates to a robotic arm comprising a first arm unit, a second arm unit, a third arm unit, a first drive system, a second drive system and a third drive system. The first arm unit is connected to the second arm unit, and the second arm unit is connected to the third arm unit. The first, second and third drive systems cause the second arm unit to move relative to the first arm unit and cause the third arm unit to move relative to the second arm unit.

12 Claims, 5 Drawing Sheets

(56) References Cited

U.S. PATENT DOCUMENTS

| | | | |
|---|---|---|---|
| 8,950,285 B2* | 2/2015 | Sim | B25J 9/1025 74/490.01 |
| 2006/0169086 A1 | 8/2006 | Garrec | |
| 2017/0009857 A1 | 1/2017 | Garrec | |

* cited by examiner

ROBOTIC ARM

BACKGROUND

1. Field

The instant disclosure relates to a robotic arm.

2. Description of Related Art

A joint of an industrial robotic arm may be equipped with an independent motor and a gear box to have different degrees of freedom. A robotic arm may have a certain amount of joints, e.g. shoulder, elbow, wrist. A torque resulted by the wrist is relatively greater than the elbow, which consumes relatively greater power of the motor arranged at the wrist. Moreover, the motor and gear box are expensive. It would be challenging to reduce the amount of motor and gear box while having a same performance.

SUMMARY

According to one exemplary embodiment of the instant disclosure, a robotic arm comprises a first arm unit with a first end and a second end, a second arm unit with a first end and a second end, wherein the first end portion of the second arm unit and the second end portion of the first arm unit are pivotally connected to each other, a first screw rod rotatably arranged within the first arm unit and extending from the first end of the first arm unit and along a lengthwise direction of the first arm unit, a first guider screwed at the first screw rod, a first drive plate rotatably disposed within the first arm unit and adjacent to the first end of the first arm unit, a second drive plate fixedly connected to the first end portion of the second arm unit and pivotally connected to the second end portion of the first arm unit, and a first transmission component connecting to the first guider, the first drive plate and the second drive plate. The first guider moves along the first screw rod when the first screw rod is rotated. Such linear motion of the first guider drives the first transmission component, and then the movement of the first transmission component drives the first and second drive plates to be rotated such that the second arm unit rotates relative to the first arm unit.

According to another exemplary embodiment of the instant disclosure, the robotic arm further comprises a second screw rod rotatably arranged within the first arm unit and extending from the first end of the first arm unit and along the lengthwise direction of the first arm unit, a second guider screwed at the second screw rod, a third drive plate rotatably disposed within the first arm unit and adjacent to the first end of the first arm unit, a fourth drive plate pivotally connected to the second end portion of the first arm unit and a first part of the first end portion of the second arm unit, a first gear integrated with the fourth drive plate, a second gear fixedly connecting to a second part of the first end portion, which can axially rotate relative to the first part of the first end portion of the second arm unit and fixedly connected to the second arm unit, and engaging with the first gear, and a second transmission component connecting to the second guider, the third drive plate and the fourth drive plate. The second guider moves along the second screw rod when the second screw rod is rotated. Such linear motion of the second guider drives the second transmission component, and then the movement of the second transmission component drives the third and fourth drive plates to be rotated such that the first gear integrated with the fourth drive plate drives the second gear connected to the second arm unit to be rotated and the second arm unit rotates relative to the first arm unit.

According to another exemplary embodiment of the instant disclosure, the robotic arm further comprises a third arm unit, wherein one end portion of the third unit and the second end portion of the second arm unit are pivotally connected to each other, a third screw rod rotatably arranged within the first arm unit and extending from the first end portion of the first arm unit and along a lengthwise direction of the first arm unit, a third guider screwed at the third screw rod, a fifth drive plate rotatably disposed within the first arm unit and adjacent to the first end portion of the first arm unit, a sixth drive plate fixedly connected to the first end portion of the third arm unit and pivotally connected to the second end portion of the first arm unit; and a third transmission component connecting to the third guider, the fifth drive plate and the sixth drive plate. The third guider moves along the third screw rod when the third screw rod is rotated. Such linear motion of the third guider drives the third transmission component and then a motion of the third transmission component drives the fifth and sixth drive plates to be rotated such that the third arm unit rotates relative to the second arm unit.

According to another exemplary embodiment of the instant disclosure, the robotic arm unit comprises an elongated main body having a first end portion and a second end portion opposite to the first end portion, a screw rod rotatably arranged within the main body and extending from the first end portion of the main body and along a lengthwise direction of the main body, a guider screwed at the screw rod, a first drive plate rotatably disposed within the main body and adjacent to the first end portion of the main body, a second drive plate rotatably disposed within the main body and adjacent to the second end portion of the main body, a transmission component connecting to the guider, the first drive plate and the second drive plate. The second drive plate can be further connected to an article. The guider moves along the screw rod when the screw rod is rotated. Such linear motion of the guider drives the transmission component, and then the movement of the transmission component drives the first and second drive plates to be rotated such that the article rotates relative to the main body of the arm unit.

In order to further understand the instant disclosure, the following embodiments are provided along with illustrations to facilitate the appreciation of the instant disclosure; however, the appended drawings are merely provided for reference and illustration, without any intention to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
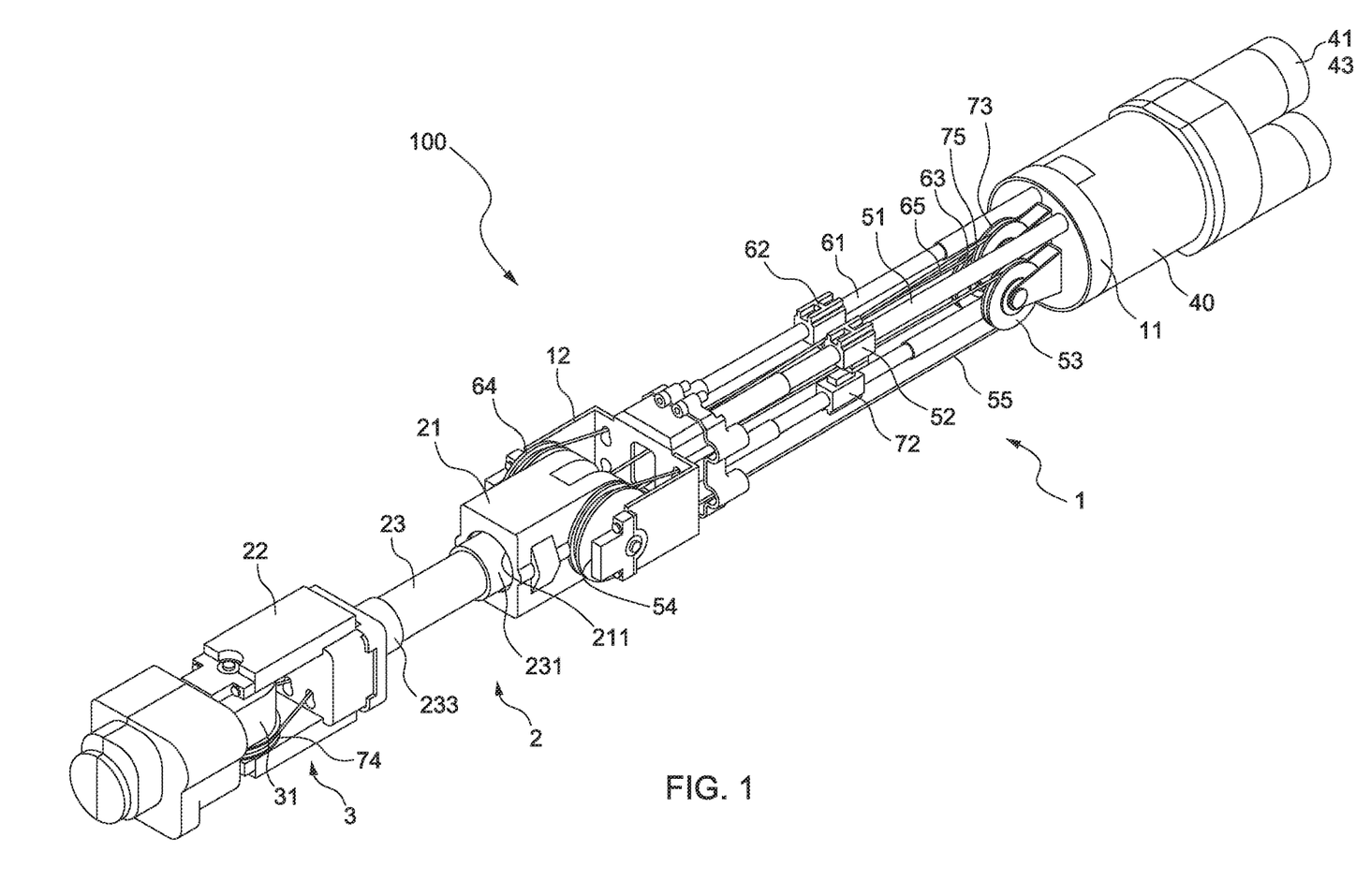
FIG. 1 is a perspective schematic view of a robotic arm in accordance with an embodiment of the instant disclosure.
Figure 2:
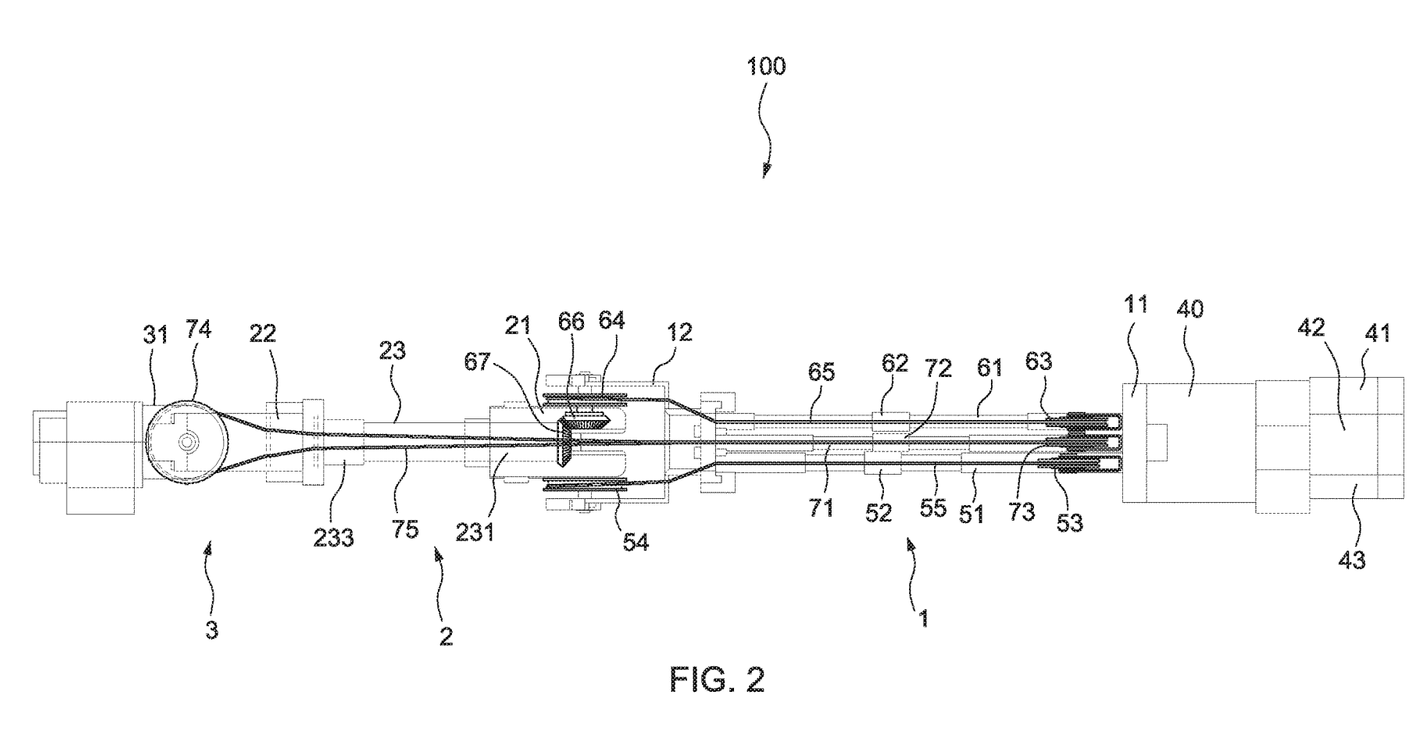
FIG. 2 is a top schematic view of a robotic arm in accordance with an embodiment of the instant disclosure.

FIGS. 1 and 2 show a structure of a robotic arm in accordance with an embodiment of the instant disclosure. As shown in FIGS. 1 and 2, the robotic arm 100 comprises a first arm unit 1, a second arm unit 2, and a third arm unit 3, wherein the first arm unit 1 is pivotally connected to the second arm unit 2 and wherein the second arm unit 2 is pivotally connected to the third arm unit 3.

Referring to FIGS. 1 and 2, the first arm unit 1 has a first end portion 11 and a second end portion 12 opposite to the first end portion 11. A gear reducer 40 is connected to the first end portion 11 of the first arm unit 1 and three motors 41, 42 and 43 are mounted to the gear reducer. These motors 41, 42 and 43 and the gear reducer 40 provide three different drivers for the robotic arm 100, which are the first driver formed by the motor 41 and the gear reducer 40, the second driver formed by the motor 42 and the gear reducer 40 and the third driver formed by the motor 43 and the gear reducer 40.

Referring to FIGS. 1 and 2, the second arm unit 2 has a substantially hollow stem 23, a first end portion 21 and a second portion 22 opposite to the first end portion 21. See FIGS. 1 and 2, one end 231 of the stem 23 passes through a shaft hole 211 of the first end portion 21 and extends into the first end portion 21 and the other end 233 of the stem 23 connects to the second end portion of the second arm unit 2. Further, the first end portion 21 of the second arm unit 2 is pivotally connected to the second end portion 12 of the first arm unit 1.

Referring to FIGS. 1 and 2, the third arm unit 3 has an end portion 31, wherein the end portion 31 of the third arm unit 3 is pivotally connected to the second end portion 22 of the second arm unit 2.

Moreover, the robotic arm 100 comprises a first, a second and a third drive systems.

Figure 3:
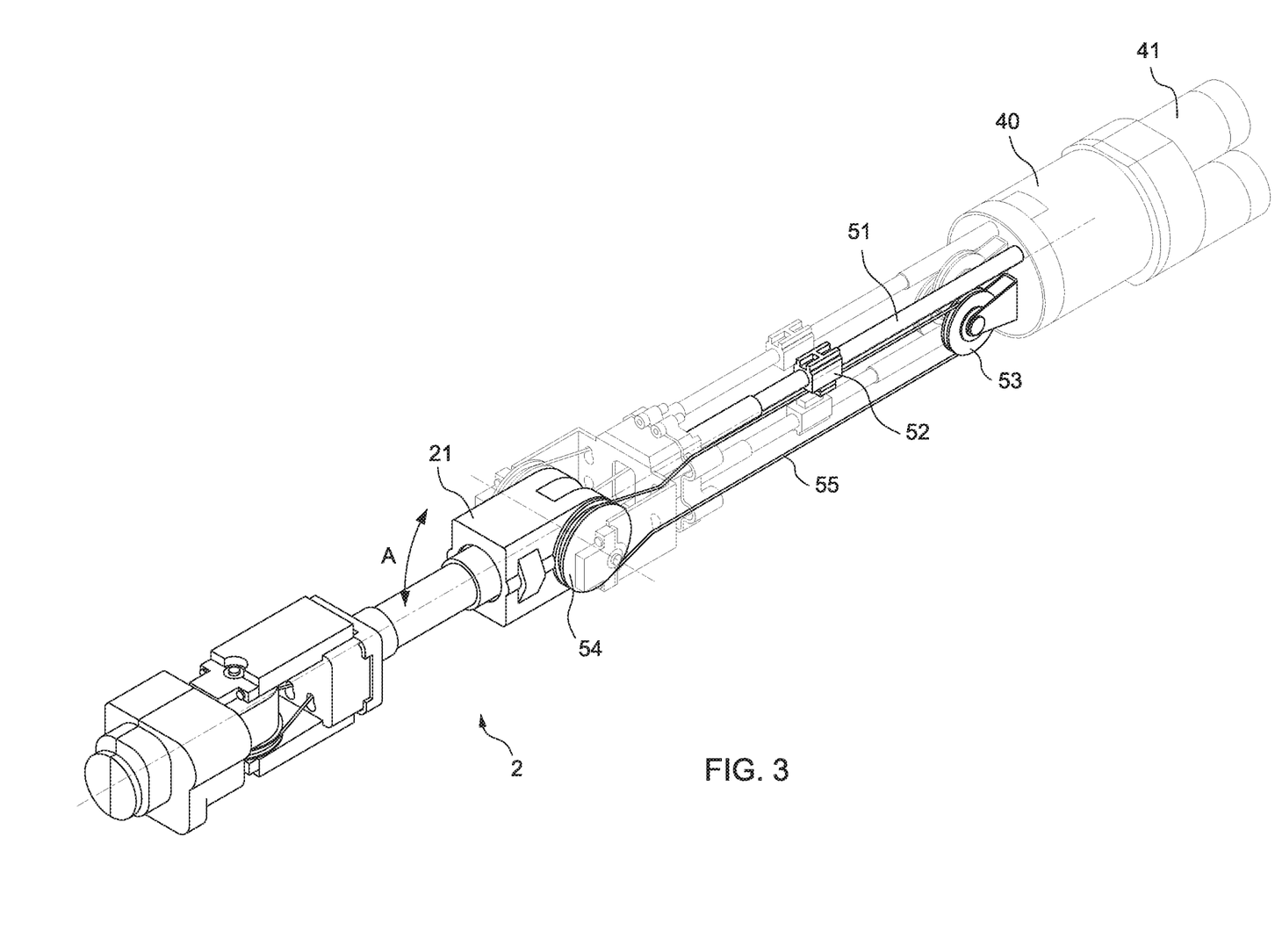
FIG. 3 is schematic view of a first drive system of a robotic arm in accordance with an embodiment of the instant disclosure.

FIG. 3 is schematic view of a first drive system of a robotic arm in accordance with an embodiment of the instant disclosure. Referring to FIG. 3, the first drive system comprises a first screw rod 51, a first guider 52, a first drive plate 53, a second drive plate 54 and a first transmission component 55. One end of the first screw rod 51 is rotatably connected to the first end portion 11 of the first arm unit 1 and the other end of the first screw rod 51 is rotatably connected to the second end portion 12 of the first arm unit 1. That is, the first screw rod 51 extends along a lengthwise direction of the first arm unit 1. Further, the first driver, which is formed by the motor 41 and the gear reducer 40, is mounted to the first end portion 11 of the first arm unit 1 and connected to the first screw rod 51. The first guider 52 is screwed at the first screw rod 51. The first drive plate 53 is rotatably mounted to the first end portion 11 of the first arm unit 1. As shown in FIG. 2, the second drive plate 54 is fixedly connected to the first end portion 21 of the second arm unit 2 and pivotally connected to the second end portion 12 of the first arm unit 1. More specially, the second drive plate 54 is mounted to the pivot of the first arm unit 1 and the second arm unit 2 but fixedly connected to the first end portion 21 of the second arm unit 2 such that the second arm unit 2 will rotate with the rotation of the second drive plate 54. The first transmission component 55 is used to connect the first guider 52, the first drive plate 53 and the second drive plate 54, wherein the first transmission 55 could be a belt and the first drive plate 53 and the second drive plate 54 could be belt pulleys, or wherein the first transmission 55 could be a cable and the first drive plate 53 and the second drive plate 54 could be coil pulleys.

As shown in FIG. 3, when the motor 41 is started, the first drive will drive the first screw rod 51 to rotate. Once the first screw rod 51 rotates, the first guider 52 will move along the first screw rod 51. Such linear motion of the first guider 52 will pull the first transmission component 55, and the first transmission component 55 will drive the first drive plate 53 and the second drive plate 54 to rotate simultaneously. When the second drive plate 54 rotates, the second arm unit 2, which is fixedly connected to the second drive plate 54, will rotate relative to the first arm unit 1. That is, the second arm unit 2 will rotate about the pivot axis L1 of the first arm unit 1 and the second arm unit 2 (see arrow A).

Figure 4:
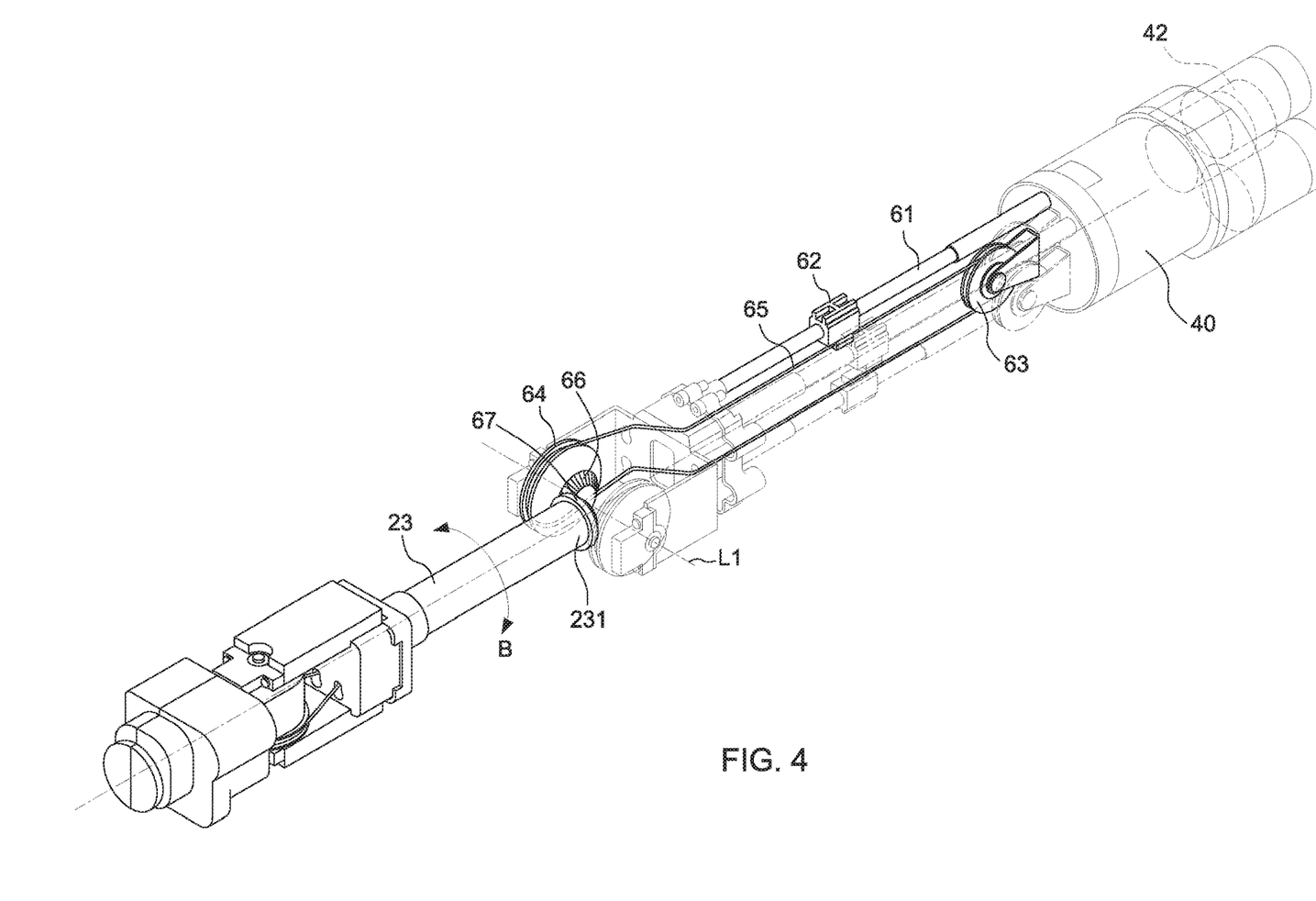
FIG. 4 is a schematic view of a second drive system of a robotic arm in accordance with an embodiment of the instant disclosure.

FIG. 4 is a schematic view of a second drive system of a robotic arm in accordance with an embodiment of the instant disclosure. Referring to FIG. 4, the second drive system comprises a second screw rod 61, a second guider 62, a third drive plate 63, a fourth drive plate 64, a second transmission component 65, a first gear 66 and a second gear 67. One end of the second screw rod 61 is rotatably connected to the first end portion 11 of the first arm unit 1 and the other end of the second screw rod 61 is rotatably connected to the second end portion 12 of the first arm unit 1. That is, the second screw rod 61 extends along a lengthwise direction of the first arm unit 1. Further, the second driver, which is formed by the second motor 42 and the gear reducer 40, is mounted to the first end portion 11 of the first arm unit 1 and connected to the second screw rod 61. The second guider 62 is screwed at the second screw rod 61. The third drive plate 63 is rotatably mounted to the first end portion 11 of the first arm unit 1. As shown in FIG. 2, the fourth drive plate 64 is pivotally connected to the second end portion 12 of the first arm unit 1 and first end portion 21 of the second arm unit 2. More specifically, the fourth drive plate 64 is mounted to the pivot of the first arm unit 1 and the second unit 2. Further, one end of the shaft of the fourth drive plate 64 extends into the first end portion 21 of the second arm unit and the first gear 66 is mounted to the end of the shaft of the fourth drive plate 64. The second gear 67 is connected to the end 231 of the stem 23 of the second arm unit 2. Further, the first gear 66 and the second gear 67 are engaged with each other. The first gear 66 and the second gear 67 could be bevel gears or helical gears. The second transmission component 65 is used to connect the second guider 62, the third drive plate 63 and the fourth drive plate 64, wherein the second transmission 65 could be a belt and the third drive plate 63 and the fourth drive plate 64 could be belt pulleys, or wherein the second transmission 65 could be a cable and the third drive plate 63 and the fourth drive plate 64 could be coil pulleys.

As shown in FIG. 4, when the motor 42 is started, the second drive will drive the second screw rod 61 to rotate. Once the second screw rod 61 rotates, the second guider 62 will move along the second screw rod 61. Such linear motion of the second guider 62 will pull the second transmission component 65, and the second transmission component 65 will drive the third drive plate 63 and the fourth drive plate 64 to rotate simultaneously. When the fourth drive plate 64 rotates, the first gear 66, which is integrated with the fourth drive plate 64, will rotate and then the second gear 67 will be rotated by the rotation of the first gear 66. Once the second gear 67 rotates, the stem 23 of the second arm unit 2 will axially rotate to the first part 211 of the first end portion 21 of the second arm unit 2. Further, the second arm unit 2 will axially rotate relative to the first arm unit 1 (see arrow B).

Figure 5:
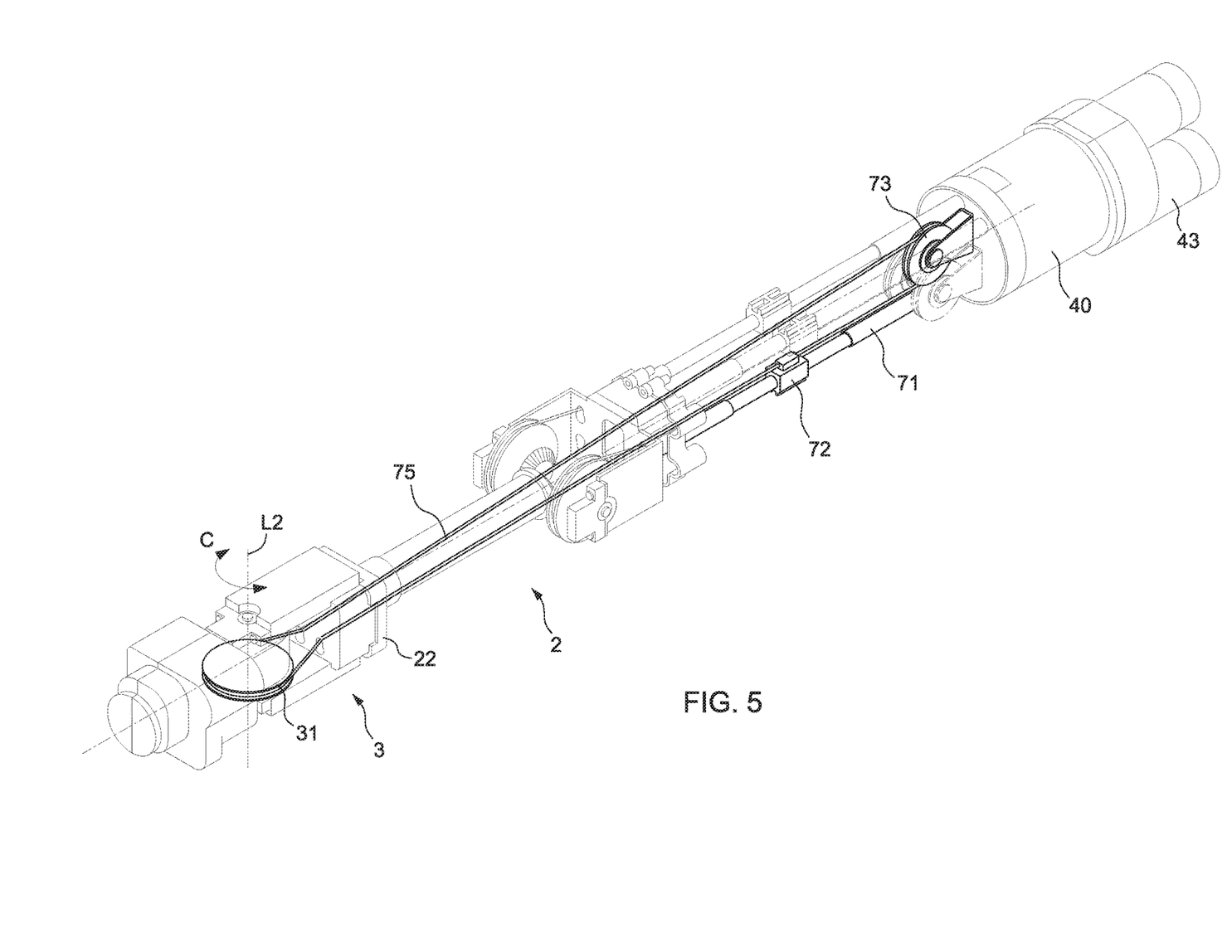
FIG. 5 is a schematic view of a third drive system of a robotic arm in accordance with an embodiment of the instant disclosure.

FIG. 5 is a schematic view of a third drive system of a robotic arm in accordance with an embodiment of the instant disclosure. Referring to FIG. 5, the third drive system comprises a third screw rod 71, a third guider 72, a fifth drive plate 73, a sixth drive plate 74 and a third transmission component 75. One end of the third screw rod 71 is rotatably connected to the first end portion 11 of the first arm unit 1 and the other end of the third screw rod 71 is rotatably connected to the second end portion 12 of the first arm unit 1. That is, the third screw rod 71 extends along a lengthwise direction of the first arm unit 1. Further, the third driver, which is formed by the third motor 43 and the gear reducer 40, is mounted to the first end portion 11 of the first arm unit 1 and connected to the third screw rod 71. The third guider 72 is screwed at the third screw rod 71. The fifth drive plate 73 is rotatably mounted to the first end portion 11 of the first arm unit 1. The sixth drive plate 74 is fixedly connected to the end portion 31 of the third arm unit 3 and pivotally connected to the second end portion 22 of the second arm unit 2. More specially, the sixth drive plate 74 is mounted to the pivot of the second arm unit 2 and the third arm unit 3 but fixedly connected to the end portion 31 of the third arm unit 3 such that the third arm unit 3 will rotate with the rotation of the sixth drive plate 74. The third transmission component 75 is used to connect the third guider 72, the fifth drive plate 73 and the sixth drive plate 74, wherein the third transmission 75 could be a belt and the fifth drive plate 73 and the sixth drive plate 74 could be belt pulleys, or wherein the third transmission 75 could be a cable and the fifth drive plate 73 and the sixth drive plate 74 could be coil pulleys. Moreover, the third transmission 75 extends through the hollow of the first end portion 21 and the stem 23 of the second arm unit 2. Further, the third transmission 75 is partially covered by the flexible sleeves (not shown).

As shown in FIG. 5, when the motor 43 is started, the third drive will drive the third screw rod 71 to rotate. Once the third screw rod 71 rotates, the third guider 72 will move along the third screw rod 71. Such linear motion of the third guider 72 will pull the third transmission component 75, and the third transmission component 75 will drive the fifth drive plate 73 and the sixth drive plate 74 to rotate simultaneously. When the sixth drive plate 74 rotates, the third arm unit 3, which is fixedly connected to the sixth drive plate 74, will rotate relative to the second arm unit 2. That is, the third arm unit 3 will rotate about the pivot axis L2 of the second arm unit 2 and the third arm unit 3 (see arrow C).

However, the above embodiments merely describe the principle and effects of the present disclosure, instead of being used to limit the present disclosure. Therefore, persons skilled in the art can make modifications and variations to the above embodiments without departing from the spirit of the present disclosure. The scope of the present disclosure should be defined by the appended claims.

What is claimed is:

1. A robotic arm, comprising:
a first arm unit having a first end portion and a second end portion;
a second arm unit having a first end portion and a second end portion; wherein the first end portion of the second arm unit and the second end portion of the first arm unit are pivotally connected to each other;
a first screw rod rotatably arranged within the first arm unit and extending from the first end portion of the first arm unit and along a lengthwise direction of the first arm unit;
a first guider screwed at the first screw rod;
a first drive plate rotatably disposed within the first arm unit and adjacent to the first end portion of the first arm unit;
a second drive plate fixedly connected to the first end portion of the second arm unit and pivotally connected to the second end portion of the first arm unit;
a first transmission component connecting to the first guider, the first drive plate and the second drive plate; wherein the first guider moves along the first screw rod when the first screw rod is rotated; and wherein a linear motion of the first guider drives the first transmission component and then a motion of the first transmission component drives the first and second drive plates to be rotated such that the second arm unit rotates relative to the first arm unit; wherein the second arm unit further comprises a stem, wherein a first end of the stem passes through a shaft hole of the first end portion of the second arm unit and extends into the first end portion of the second arm unit and a second end of the stem is connected to the second end portion of the second arm unit, and wherein the stem axially rotates relative the first end portion of the second arm unit;
a second screw rod rotatably arranged within the first arm unit and extending from the first end portion of the first arm unit and along the lengthwise direction of the first arm unit;
a second guider screwed at the second screw rod;
a third drive plate rotatably disposed within the first arm unit and adjacent to the first end portion of the first arm unit;
a fourth drive plate rotatably pivotally connected to the second end portion of the first arm unit and first end portion of the second arm unit;
a first gear integrated with the fourth drive plate;
a second gear connecting to the first end of the stem, which is arranged within the first end portion of the second arm unit, and engaging with the first gear;
a second transmission component connecting to the second guider, the third drive plate and the fourth drive plate; wherein the second guider moves along the second screw rod when the second screw rod is rotated; and wherein a linear motion of the second guider drives the second transmission component and then a motion of the second transmission component drives the third and fourth drive plates to be rotated such that the first gear integrated with the fourth drive plate drives the second gear connected to the first end of the stem of the second arm unit to be rotated and the second arm unit axially rotates relative to the first arm unit;
a third arm unit, wherein one end portion of the third unit and the second end portion of the second arm unit are pivotally connected to each other;
a third screw rod rotatably arranged within the first arm unit and extending from the first end portion of the first arm unit and along a lengthwise direction of the first arm unit;
a third guider screwed at the third screw rod;
a fifth drive plate rotatably disposed within the first arm unit and adjacent to the first end portion of the first arm unit;

a sixth drive plate fixedly connected to the first end portion of the third arm unit and pivotally connected to the second end portion of the first arm unit; and a third transmission component connecting to the third guider, the fifth drive plate and the sixth drive plate; wherein the third guider moves along the third screw rod when the third screw rod is rotated; and wherein a linear motion of the third guider drives the third transmission component and then a motion of the third transmission component drives the fifth and sixth drive plates to be rotated such that the third arm unit pivotally rotates relative to the second arm unit.

2. The robotic arm of claim 1, further comprising a first driver mounted to the first end portion of the first arm unit and connecting to the first screw rod, wherein the first driver drives the first screw rod to be rotated.

3. The robotic arm of claim 1, wherein the first drive plate and the second drive plate are belt pulleys and wherein the first transmission is a belt.

4. The robotic arm of claim 1, wherein the first drive plate and the second drive plate are coil pulleys and wherein the first transmission is a cable.

5. The robotic arm of claim 1, further comprising a second driver mounted to the first end portion of the first arm unit and connecting to the second screw rod, wherein the second driver drives the second screw rod to be rotated.

6. The robotic arm of claim 1, wherein the third drive plate and the fourth drive plate are belt pulley and wherein the second transmission is a belt.

7. The robotic arm of claim 1, wherein the third drive plate and the fourth drive plate are coil pulley and wherein the second transmission is a cable.

8. The robotic arm of claim 1, wherein the first gear and the second gear are bevel gears.

9. The robotic arm of claim 1, further comprising a third driver mounted to the first end portion of the first arm unit and connecting to the third screw rod, wherein the third driver drives the third screw rod to be rotated.

10. The robotic arm of claim 1, wherein the fifth drive plate and the sixth drive plate are belt pulleys and wherein the third transmission is a belt.

11. The robotic arm of claim 1, wherein the fifth drive plate and/or the sixth drive plate are coil pulleys and wherein the third transmission is a cable.

12. The robotic arm of claim 1, further comprising a flexible sleeve which partially covers the third transmission component.

* * * * *